US010772265B1

United States Patent
Alsharaeh et al.

(10) Patent No.: US 10,772,265 B1
(45) Date of Patent: Sep. 15, 2020

(54) METHOD OF MAKING MUTLILAYER SOIL WITH PROPERTY FOR EXTENDED RELEASE WATER FOR DESERT AGRICULTURE

(71) Applicant: Alfaisal University, Riyadh (SA)

(72) Inventors: Edreese H Alsharaeh, Riyadh (SA); Mohan Raj Krishnan, Riyadh (IN)

(73) Assignee: Alfaisal University, Riyadh (SA)

( * ) Notice: Subject to any disclaimer, the term of this patent is extended or adjusted under 35 U.S.C. 154(b) by 0 days.

(21) Appl. No.: 16/675,426

(22) Filed: Nov. 6, 2019

(51) Int. Cl.
*A01G 24/42* (2018.01)
*A01G 24/35* (2018.01)

(52) U.S. Cl.
CPC .............. *A01G 24/42* (2018.02); *A01G 24/35* (2018.02)

(58) Field of Classification Search
CPC ........ A01G 24/42; A01G 24/35; A01G 24/00; A01G 24/46; A01G 24/12; A01G 24/20
USPC ....... 47/58.1 SC; 504/113; 405/229; 427/204
See application file for complete search history.

(56) References Cited

U.S. PATENT DOCUMENTS

| | | | | |
|---|---|---|---|---|
| 5,472,458 A | * | 12/1995 | Ogawa | A01G 25/00 47/1.01 R |
| 5,580,192 A | * | 12/1996 | Ogawa | A01G 25/00 405/263 |
| 9,686,923 B2 | * | 6/2017 | Wakita | A01G 25/00 |
| 2010/0071261 A1 | * | 3/2010 | Thrash | A01G 22/00 47/58.1 SC |
| 2013/0005569 A1 | * | 1/2013 | Hendrickson | C09K 17/22 504/101 |

FOREIGN PATENT DOCUMENTS

CA 2931520 A1 * 6/2015 ............. A01G 24/00

* cited by examiner

Primary Examiner — Magdalena Topolski
Assistant Examiner — Katelyn T Truong
(74) Attorney, Agent, or Firm — Geeta Kadambi; Riddhi IP LLC

(57) ABSTRACT

The multi-layered sand assembly comprising neat sand, super-hydrophilic and super-hydrophobic sands for feasible and sustainable desert agriculture is described. The ingredients such as PAM used in the super-hydrophilic sand layer and the PS-PMMA/DVB polymer for the super-hydrophobic layer are relatively less expensive and thus the overall development of the coated sand is economical and cost effective for the mass production of modified sand layers. The tandem action of high water absorption and retention over time by super-hydrophilic sand layer and high water repulsion to avoid water loss by super-hydrophobic sand of the proposed assembly would make the achievable agriculture in desert lands.

8 Claims, 3 Drawing Sheets

METHOD OF MAKING MUTLILAYER SOIL WITH PROPERTY FOR EXTENDED RELEASE WATER FOR DESERT AGRICULTURE

FILED OF INVENTION

This application describes method of making a multilayer soil with extended release of water for agricultural purpose in desert areas.

BACKGROUND

Many countries with desert land suffer from desertification due to the low water storage capacity of sand with extremely high water evaporation. Hence, the desert agriculture is an ever standing challenge. Despite the water affinity towards the sand, the main limitation remains to be the water retention by the sand. With world population on the rise there is an urgent need to increase food production in every possible area. There is an urgent need for a sustainable solution that is easy to implement.

SUMMARY OF INVENTION

The current invention describes a method of layering sand in a multi-layered configuration which has a sustained release capability of water. In one embodiment, a four layered sand assembly, which would maximize the water absorption, retention and extended release for the desert agriculture is described. In another embodiment, the said sand layers comprises of neat-sand as a first layer, super-hydrophilic sand as a second layer and super hydrophobic sand as a third layer, and use the ground as a fourth layer. In one embodiment, the said layered sand assembly can be used for desert or arid soil to encourage agriculture.

In another embodiment, a composition of the layered sand assembly is described as follows. First layer consists neat-sand that would allow the free flow of water. Second layer is the super-hydrophilic sand that can absorb and retain the water within its matrix. Third layer is the super-hydrophobic sand designed to repel the water at the second layer which in turn helps to maximize the storage of water in the second layer. The fourth layer is the ground which might comprises sand and/or other soils.

In one embodiment, the method of making the super-hydrophilic sand is by coating the sand with well crosslinked polyacrylamide (PAM). In another embodiment, the super-hydrophilic hydrogel solution was prepared by mixing a specific amount of polyacrylamide (PAM) and cross linkers in distilled water. The cross linkers include but not limited to hydroquinone (HQ) and hexamethylenetetramine (HMT). The super-hydrophilic hydrogel solution was then mixed with the sand and treated at high temperature.

In one embodiment, the method of making the super-hydrophobic sand by coating the sand with styrene (S) and methyl methacrylate (MMA) in-situ bulk polymerization method. In another embodiment, the super-hydrophobic sand was prepared by coating with highly hydrophobic and well crosslinked PS-PMMA/DVB onto the sand. The super-hydrophobic coating was carried out by in-situ bulk polymerization method. The samples were prepared by polymerizing styrene (S), methyl methacrylate (MMA) in presence of sand with azobisisobutyronitrile (AIBN) as an initiation and divinyl benzene (DVB) as a crosslinker. Other features will be apparent from the accompanying drawings and from the detailed description that follows.

BRIEF DESCRIPTION OF DRAWINGS

Example embodiments are illustrated by way of example and not limitation in the figures of the accompanying drawings, in which like references indicate similar elements and in which.

Figure 1:
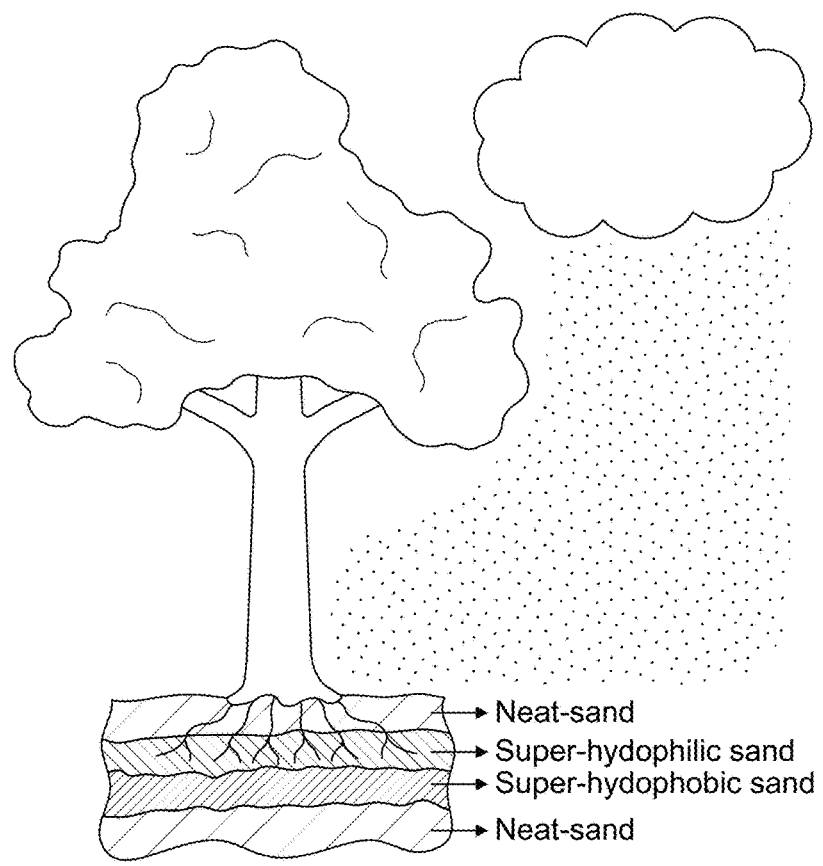
FIG. 1 shows the proposed four layered sand assembly for desert agriculture.

Other features of the present embodiments will be apparent from the accompanying drawings and from the detailed description that follows.

DETAILED DESCRIPTION

The present disclosure shows a composition, method of making and use for a layered sand that is assembled for desert agriculture. A four layered assembly of sand with excellent capacity for water absorption and slow water releasing ability is disclosed. Generally, sand is an abundant natural resource in the desert and has a low water storage capacity and suffers from storage of water especially when cultivated under dry conditions. Thus, some of the current methods used to overcome the desertification involve irrigation systems such as sprinkling/trickling and/or micro-irrigation system. However, these methods are expensive to install and require constant maintenance. Therefore, this invention offers a facile and cost effective method to overcome the desertification by proposing four layered assembly of sand. Sand consists of hydrophilic silica, which attracts water and facilitates its flow to the ground. Sand has a good interaction with hydrophilic polymers (i.e. hydrogel), and coating the sand with super-hydrophilic polymers can increase the water holding capacity of sandy soils. The coating of the sand with hydrophobic polymers on the other hand can encourage repellence of water from the sandy soils. Hence, this invention proposes a four layered sand based polymer assembly in presence of neat-sand as well as both super-hydrophilic sand and super-hydrophobic sand.

The source and specifications of the chemicals are herein disclosed. Polyacrylamide (550,000 g/mol)) was purchased from Flotek. The organic cross-linkers, hydroquinone (HQ) and hexamethylenetetramine (HMT) were obtained from Loba Chemie. The sand samples were received from Saudi Arabian deserts. The styrene (S) monomer ($M_w$=104.15 g/mol, >99% purity) and divinyl benzene were purchased from Sigma Aldrich. The MMA monomer ($M_w$=100.12 g/mol, 99% purity) and the initiator AIBN ($M_w$=164.21 g/mol) were purchased from Aldrich. All the chemicals are of analytical grade and used without any further treatment or purification.

The hydrophilic polymers are hydrogels in general. The examples include but not limited to cross-linked polyacrylamide (PAM), polyacrylic acid (PAA), polymethacrylic acid (PMAA), polyamines (PA), polyethylene oxide (PEO), polyvinyl alcohol (PVA) and their alkali metal salts. In addition, copolymer hydrogels of biopolymer and synthetic polymer are also the possible options for the super-hydrophilic sand modification. The examples include but not limited to carboxymethylcellulose-polyvinylpyrrolidone (CMC-PVP), starch-polyvinyl alcohol (S-PVA), starch-ethylene-co-vinyl alcohol (S-EVA), starch-acrylic acid (S-AA) and starch-chitosan (S-C). The cross-linkers are organic cross-linkers in general. The examples include but not limited to hydroquinone (HQ) and hexamethylenetetramine (HMT), tetramethylethyelenediamine (TMED), glyoxal, dextrins, alginates, epichlorohydrin, dialdehyde, formaldehyde, glutaraldehyde, ethyelene glycol dimethacrylate (EGDMA), N, N' methylenebisacrylamide (MBA), and polyethylene glycol (PEG).

The examples for hydrophobic polymers include but not limited to polystyrene (PS), polysulfone polycarbonate (PC), polydivinylbenzene (PDVB), polymethylmethacrylate (PMMA), and their co- and ter-polymers.

The method of making the super-hydrophilic sand involves the step of coating the sand with super-hydrophilic polymers including but not limited to polyacrylamide (PAM). Meanwhile, the super-hydrophobic sand is coated with super-hydrophobic polymers i.e. including but not limited to styrene (S) and methylmethacrylate (MMA). This assembly encourages excellent water absorption, retention and extended release of water since the first layer (i.e. neat-sand) will allows the free flow of water to the second layer (i.e. super-hydrophilic sand) that will absorbs and retains the water within its matrix. The third layer (i.e. super-hydrophobic sand) will repel the water at the second layer which in turn helps to maximize the storage of water in the second layer. Meanwhile, the fourth layer is the ground.

The method of using the four layered sand assembly can be described as the first layer enables the free flow of water to the second layer (i.e. the super-hydrophilic layer), where it can efficiently absorb/stored the water. Meanwhile, the third layer that contains super-hydrophobic sand with its inherent water repellence helps the water to retain in the second super-hydrophilic sand layer and also minimizes the water flow to the ground by setting up a hydrophobic barrier. The water stored in the second layer will efficiently be used for the plantation over a long period of time as it offers extended water release, thus acting as a water reservoir. The proposed invention would be a big hope in achieving the most-challenging desert agriculture along with water storage in the desert countries.

This invention describes the preparation of a four layered assembly sand comprising coated and neat-sands for the desert agriculture in a cost effective way. FIG. 1 illustrates the schematic representation of the proposed four layered assembly sand for desert agricultural application. As shown in FIG. 1, first layer consists neat-sand that would allow the free flow of water. Second layer is the super-hydrophilic sand that can absorb and retain the water within its matrix. The super-hydrophilic sand will be prepared by coating the sand with well crosslinked polyacrylamide (PAM). Third layer is the super-hydrophobic sand designed to repel the water at the second layer which in turn helps to maximize the storage of water in the second layer. The super-hydrophobic sand will be prepared by coating the sand with styrene (S) and methyl methacrylate (MMA) in-situ bulk polymerization method. The fourth layer is the ground which might comprises sand and/or other soils.

Figure 2:
FIG. 2 shows the super-hydrophilic sand coated with different amount of PAM.

The method of making the layered sand assembly second layer is performed by preparing the super-hydrophilic hydrogel solution by mixing a specific amount of polyacrylamide (PAM) and cross linkers in distilled water. The cross linkers include but not limited to hydroquinone (HQ) and hexamethylenetetramine (HMT). The super-hydrophilic hydrogel solution was then mixed with the sand and treated at high temperature as shown in FIG. 2. FIG. 2 shows the super-hydrophilic sand coated with different amount of PAM.

Figure 3:
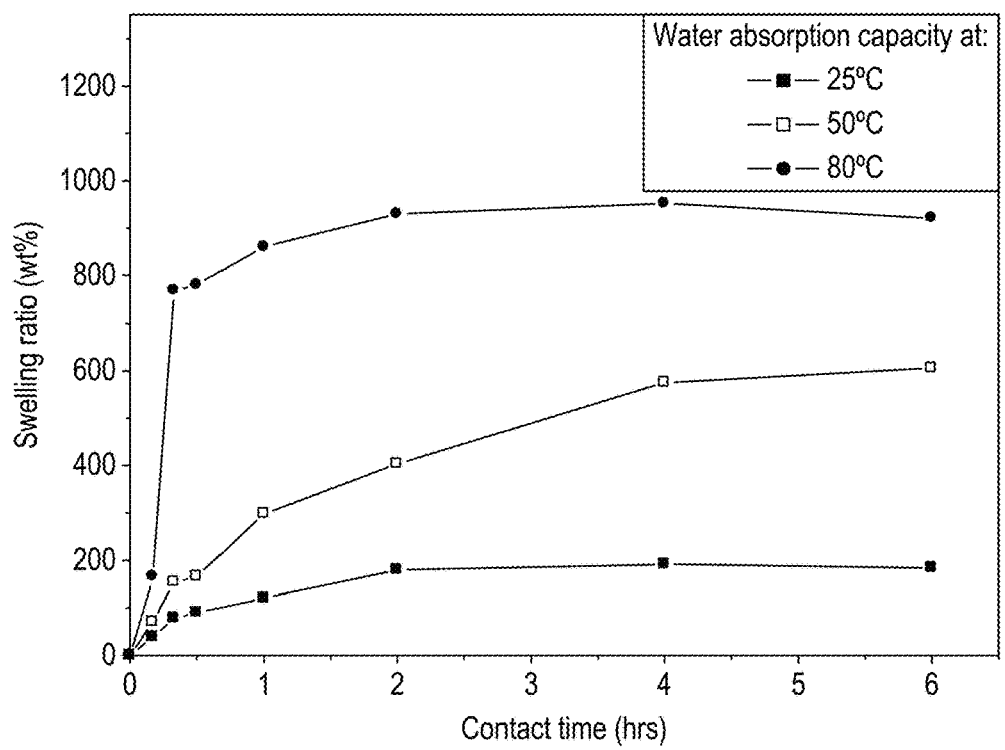
FIG. 3 shows the water absorption kinetics of the super-hydrophilic sand at different environmental conditions.
Figure 4:
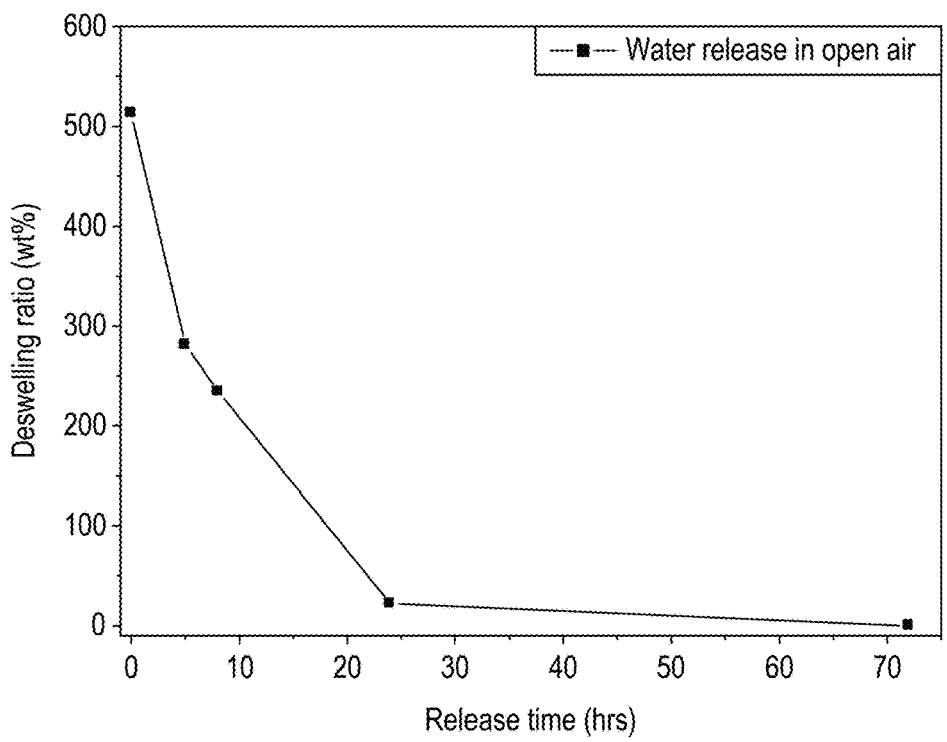
FIG. 4 shows the water extended release capacity of the swelled super-hydrophilic sand at room temperature.

The water absorption for the prepared super-hydrophilic sand has been studied based on the optimized coating thickness at various environmental conditions. As shown in FIG. 3, the maximum water absorption was achieved as high as 150% to 800% within 2 hours at temperature reaching from 25° C. Overall, the super-hydrophilic sand displayed water absorption capacities at relatively faster rates mainly at higher temperature i.e. the higher the temperature, the higher the water absorption. This trend is obviously advantageous when we go for the practical desert agricultural applications as this layer will be employed underneath to the neat-sand layer wherein it is expected the temperature will be higher. In addition, the water absorbed super-hydrophilic sand has been subjected to water evaporation at open air i.e. ambient conditions, and found that the water can be retained for at least 48 hours before it is completely dried out as shown in FIG. 4. This appreciable water holding and storage properties of the super-hydrophilic sand will help successful desert plantation. FIG. 3 explicitly shows the water absorption kinetics of the super-hydrophilic sand at different environmental conditions. FIG. 4 shows the water extended release capacity of the swelled super-hydrophilic sand at room temperature.

Figure 5:
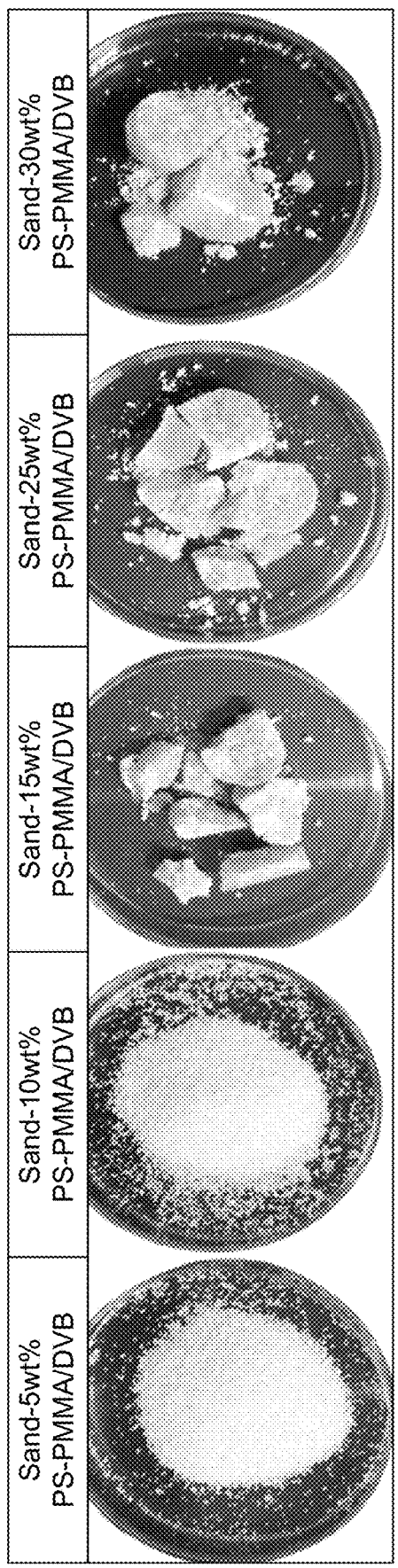
FIG. 5 shows the super-hydrophobic sand coated with different amount of PS-PMMA/DVB.

The super-hydrophobic sand was prepared by coating with highly hydrophobic and well crosslinked PS-PMMA/DVB onto the sand. The super-hydrophobic coating was carried out by in-situ bulk polymerization method. The samples were prepared by polymerizing styrene (S), methyl methacrylate (MMA) in presence of sand with azobisisobutyronitrile (AIBN) as an initiation and divinyl benzene (DVB) as a crosslinker. The samples were prepared with different coating thickness as shown in FIG. 5. The water absorption studies were carried out for the super-hydrophobic sand and was found to be extremely low. FIG. 5 also shows the super-hydrophobic sand coated with different amount of PS-PMMA/DVB.

A composition of four layered sand assembly comprising of neat sand as the first layer, super-hydrophilic and super-hydrophobic sands as second and third layers respectively with the ground as the fourth layer for feasible and sustainable desert agriculture is disclosed. As an exemplary system, the super-hydrophilic polymer but not limited to PAM used in the super-hydrophilic sand layer and the hydrophobic polymer but not limited cross-linked PS-PMMA/DVB used in the super-hydrophobic sand layer. Interestingly, the super-hydrophilic and super-hydrophobic layers are relatively cheaper as per the calculations based on the materials abundance and the amount of chemicals required for the successful preparation of the proposed assembly and hence the overall development of the coated sand is economical for the mass production of modified sand layers. The parallel action of high water absorption, storage and controlled release over time by the super-hydrophilic sand layer and the high water repulsion by super hydrophobic sand which effectively circumvent the water loss through ground would make the agriculture achievable in desert lands.

What is claimed is:
1. A composition of a four layered sand assembly, consisting of:
   a. a neat-sand as layer 1;
   b. a super-hydrophilic sand as layer 2;

c. a super hydrophobic sand as layer 3, wherein the super-hydrophobic sand has a coating, the coating consists of a polystyrene-polymethylmethacrylate-divinyl benzene polymer (PS-PMMA-DVB) at different coating thickness; and d. a ground as a layer 4.

2. The composition of a four layered sand assembly as in claim 1, wherein the super-hydrophilic sand has a coating, which consists of a polyacrylamide (PAM) polymer.

3. The composition of a four layered sand assembly as in claim 1, wherein the super hydrophilic sand has a specific weight per weight % for the sand to the polyacrylamide (PAM), wherein the a specific weight per weight % is between 0.5 wt % to 10 wt %.

4. The composition of a four layered sand assembly of claim 3, wherein the weight % of the polyacrylamide (PAM) polymer is 4 wt %.

5. The composition of a four layered sand assembly of claim 1, wherein the super hydrophobic sand has a specific weight/weight % for the sand to the polystyrene-polymethylmethacrylate divinyl benzene (PS-PMMA DVB) polymer.

6. The composition of a four layered sand assembly of claim 5, wherein the sand weight % to the polystyrene-polymethylmethacrylate-divinyl benzene (PS-PMMA-DVB) weight % is in range of 5 wt % to 30 wt %.

7. The composition of a four layered sand assembly of claim 1, wherein the polystyrene-polymethylmethacrylate-divinyl benzene (PS-PMMA-DVB) polymer is prepared using a mixture of monomers styrene:methylmethacrylate:divinylbenzene (S:MMA:DVB) in a weight ratio of 1:1:0.01.

8. A method of making a four layered sand assembly, comprising of;

adding a neat-sand as a layer 1, making a super-hydrophilic polyacrylamide (PAM) hydrogel solution by mixing 4 wt % of a polymer in aqueous solution in presence of hydroquinone (HQ) and hexamethylenetetramine (HMT) cross linkers at room temperature to make the super-hydrophilic polyacrylamide (PAM) hydrogel; coating a sand with the super-hydrophilic polyacrylamide (PAM) hydrogel by mixing sand and super-hydrophilic polyacrylamide (PAM) hydrogel and leaving them in a chandler at 310° F. for 4 hrs to make a gelled sand;

adding the gelled sand as a layer 2;

mixing a super hydrophobic sand with a 30 wt % of polystyrene-polymethylmethacrylate/divinyl benzene (PS-PMMA/DVB) and polymerizing in-situ in presence of the initiator azobisisobutyronitrile (AIBN) at 70° C. for 24 hours, to make a coating on the super-hydrophobic sand, the coating consists of the PS-PMMA-DVB at different coating thickness;

adding a super-hydrophobic sand as layer 3;

layering the layer 1, layer 2 and layer 3 on top of regular soil (layer 4) to create the four layered sand assembly.

* * * * *